United States Patent [19]

Braak

[11] 4,352,110

[45] Sep. 28, 1982

[54] METHOD FOR SITING COSINE-SQUARED ANTENNAS AND ANTENNA ARRAY OBTAINED THEREBY

[75] Inventor: Dirk J. Braak, Heroldsberg, Fed. Rep. of Germany

[73] Assignee: Te Ka De Felten & Guilleaume Fernmeldeanlagen GmbH, Nuremberg, Fed. Rep. of Germany

[21] Appl. No.: 155,483

[22] Filed: Jun. 2, 1980

[30] Foreign Application Priority Data

Jun. 7, 1979 [DE] Fed. Rep. of Germany ....... 2923088

[51] Int. Cl.³ .............................................. H01Q 21/06
[52] U.S. Cl. .................................................. 343/844
[58] Field of Search ........................ 343/844, 854, 853

[56] References Cited

PUBLICATIONS

MacDonald: The Cellular Concept; Bell System Technical Journal; Jan. 1979, pp. 15–41.

Primary Examiner—Eli Lieberman
Attorney, Agent, or Firm—Michael J. Striker

[57] ABSTRACT

A method for optimally siting cosine-squared antennas in an array is taught, along with the array which is produced by use of the array. The array in question utilizes a dense hexagonal cellular grid, and each individual antenna is assigned a frequency group on which the antenna operates. The cells are ordered in such a fashion as to keep co-channel interference to a minimum.

11 Claims, 11 Drawing Figures

HEXAGONAL CELL WITH CIRCUMSCRIBED CIRCLE

TYPE I
CELL CLUSTER

TYPE II
CELL CLUSTER

TYPE III
CELL CLUSTER

TYPE IV
CELL CLUSTER

METHOD FOR SITING COSINE-SQUARED ANTENNAS AND ANTENNA ARRAY OBTAINED THEREBY

BACKGROUND OF THE INVENTION

1. Field of the Invention

This invention pertains to radio antennas. More particularly, this invention pertains to an array of such antennas which is so ordered as to create an optimally sited fixed antenna network which is suited to use in, e.g. an AMPS system.

2. Description of the Prior Art

Mobile telephones, such as those which are installed in automotive vehicles and the like, must be linked to the telephone switching system by means of fixed antennas. In regions where radio traffic is dense, it is desirable to provide a large number of users with mobile telephone service without co-channel interference taking place between radio transmissions which are transmitted simultaneously.

To this end, various antenna systems have been developed. In an article entitled *The Cellular Concept*, which article appears in The Bell System Technical Journal of January 1979, a plurality of such systems are discussed and a new system denoted AMPS (an acronym for Advanced Mobile Phone Service) is set forth.

In the system which is newly-disclosed therein, use is made of a cellular antenna array in which a basic hexagonal cell (which may have a varying size) is equipped with three sector antennas. Each such sector antenna has a 120° directional characteristic, and the three antennas are so oriented as to provide 360° coverage from each cell. Moreover, in the system disclosed in this reference, each such cell transmits and receives over frequencies within a given frequency group, and the frequency groups are relatively numerous.

At page 22 of this reference, a co-channel reuse ratio is computed, which co-channel reuse ratio is used as an index of transmission quality. This co-channel reuse ratio increases with an increasing number of frequency groups utilized, and decreases with a decreasing number of frequency groups utilized.

The AMPS system disclosed in this reference thus has two major disadvantages. Firstly, it is necessary to construct three antennas at each cell site. Secondly, it is necessary to utilize a relatively large number of frequency groups in order to achieve the requisite transmission quality, and it is thus necessary to utilize a relatively wide portion of the available frequency spectrum. Thus, it would be desirable to provide an antenna array which would not require a plurality of antennas for each cell site, and which would operate using a lower number of frequency groups.

SUMMARY OF THE INVENTION

These objects, along with others which will appear hereinafter, are achieved by the use of a different antenna type. In this invention, cosine-squared antennas are utilized. Because of the particular directionality of these antennas, the antennas are located outside the cells with which they are associated, and not inside or at the corners of such cells as is disclosed in the prior art. Moreover, because of the particular way in which the antennas are organized to form an array, only one antenna need be provided for each cell in the network formed, rather than the three antennas provided in, e.g., an AMPS system.

Additionally, the number of frequency groups which is required in this invention is nowhere near as high as the number of such frequency groups which is required by the prior art. In this fashion, the portion of the frequency spectrum which is actually utilized by this invention is kept relatively narrow.

This latter feature of the invention is particularly useful in areas which have dense radio traffic. Inasmuch as it is necessary to separate cells which operate on the same frequency groups sufficiently so as to prevent co-channel interference during simultaneous transmissions, and inasmuch as it may be impossible as a practical matter to situate cells far enough apart from each other, maintenance of the number of frequency groups utilized at a minimum is an almost essential task.

It is to be noted that the invention herein encompasses two things: a method which is useful in determining the proper placement of such cosine-squared antennas, and an antenna array which is produced by use of this method. The antennas actually utilized are already known on an individual basis. However, as will be seen hereinafter, the highly advantageous results which are achieved by siting the antennas according to this invention can only be produced when these known antennas are ordered in the particular fashion and according to the particular principles disclosed herein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Unless the context clearly requires otherwise, the term "antenna" (whether used singularly or in plural) denotes an antenna of a conventional cosine-squared type. Although it is true that antennas with perfect cosine-square directionality are not commercially available since every antenna has directional lobes which do not correspond with perfect cosine-squared directionality, the non-perfection of such antenna characteristics is not a bar to the successful practice of this invention, since such characteristics are sufficiently small as to result in an entirely acceptable result.

Figure 1:
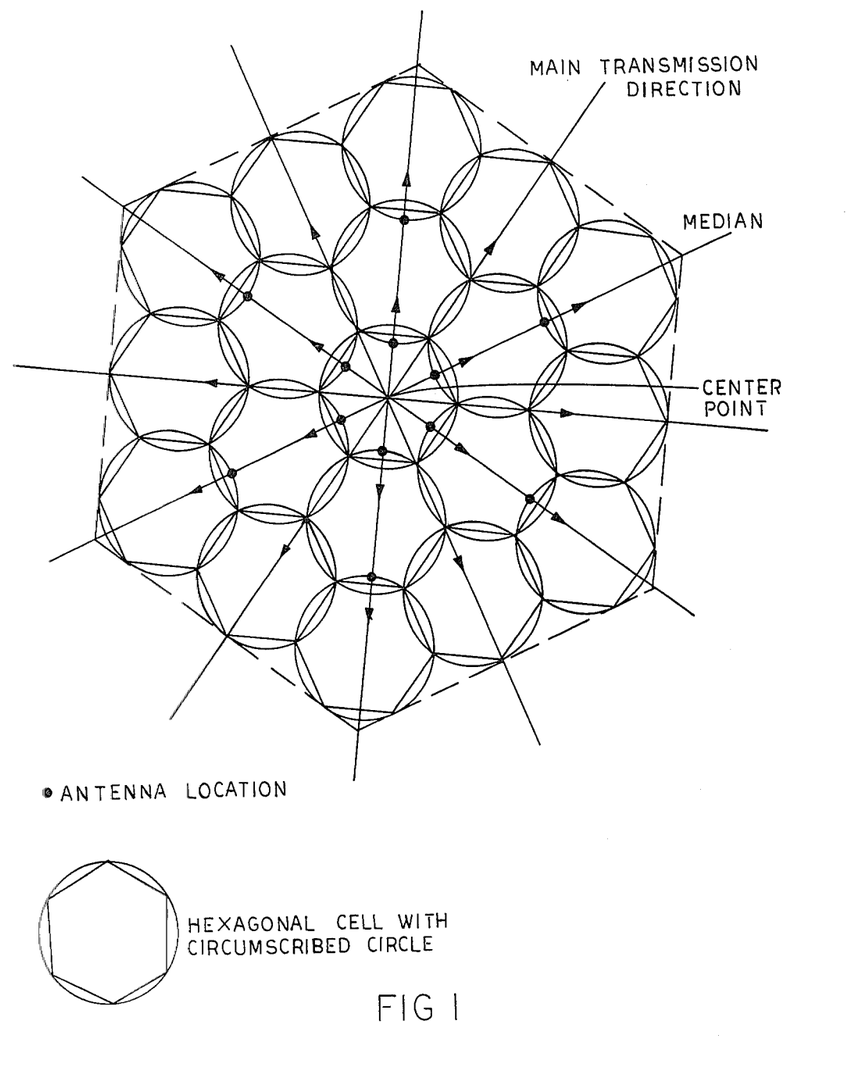
FIG. 1 shows a cell cluster of hexagonal cells and antennas associated therewith ordered according to the principles of this invention.

FIG. 1 shows a cell cluster which, together with others of like configuration, forms a dense hexagonal cellular grid system—a system which will cover a plane completely with identical hexagonal cells without leaving any gaps in the plane which are not within any cell and without leaving any regions in the plane which belong to two cells simultaneously. In order to generate such a dense hexagonal cellular grid system, it is only necessary to produce a plurality of cell clusters such as are shown in FIG. 1 and order such cell clusters so that each cell cluster abuts six others in exactly the same fashion that each hexagonal cell within the system abuts six others of like configuration.

Thus, generation of such a dense hexagonal cellular grid system reduces as a matter of principle to a generation of an individual cell cluster. Initially, a geographical area in which antennas are sited is covered with a number of hexagons which are appropriately sized and which are so ordered that each hexagon is surrounded and abutted by six other hexagons of like kind. These latter six hexagons are, in turn, surrounded by twelve other hexagons of like kind and so on, until the entire geographical area is covered.

Next, a circle is circumscribed around every single hexagonal cell in the area. All cells and all circles circumscribed thereabout are classified into like hexagonal cell clusters. (It will of course be obvious to one skilled in the art that there are limits to the number of cell clusters which are used, and that it is entirely possible that some cells on the outermost boundary of the geographical area in question may not in fact be members of complete cell clusters. However, as will be seen hereinafter, this does not detract from the practice of the invention herein.)

In the cell clusters shown in FIG. 1, there are nineteen hexagonal cells enclosed within the cell cluster which is there shown. The cell which includes the centerpoint of the cell cluster is called the center cell. Within the center cell, there are seven antennas—one at the center point, and six other antennas which are each located adjacent a corresponding side of the cell.

As can be seen in FIG. 1, all of the circumscribed circles (saving only that circumscribed circle which is circumscribed around the center cell) have site points located on their circumferences. In each case, a site point is located at that point of its corresponding circumscribed circle which is radially innermost, i.e. at that point which is closest to the center point of the cell cluster. Thus, it can be seen that each site point is uniquely associated with a corresponding cell, but is located outside the cell rather than inside it.

Because the antennas used are of the cosine-squared type, the cell cluster shown in FIG. 1 has main transmission directions which are perpendicular to the edges of the cell cluster and also has medians which are aligned with the vertices of the cell cluster. This embodiment, as can be seen in FIG. 1, requires only one antenna for each cell, and is therefore economical. (It will be obvious to those skilled in the art that each antenna utilized must be capable of both transmitting radio signals and of receiving radio signals. Both these functions may be combined in one physical unit, or two physical units located adjacent each other may also be employed. Moreover, it will be readily appreciated by those skilled in the art that it might be impossible as a practical matter to precisely situate all of the various site points and the center point at the locations shown in FIG. 1. However, exact placement of antenna site is merely desirable—it is not an absolute prerequisite for the proper operation of the invention herein.)

Figure 2:
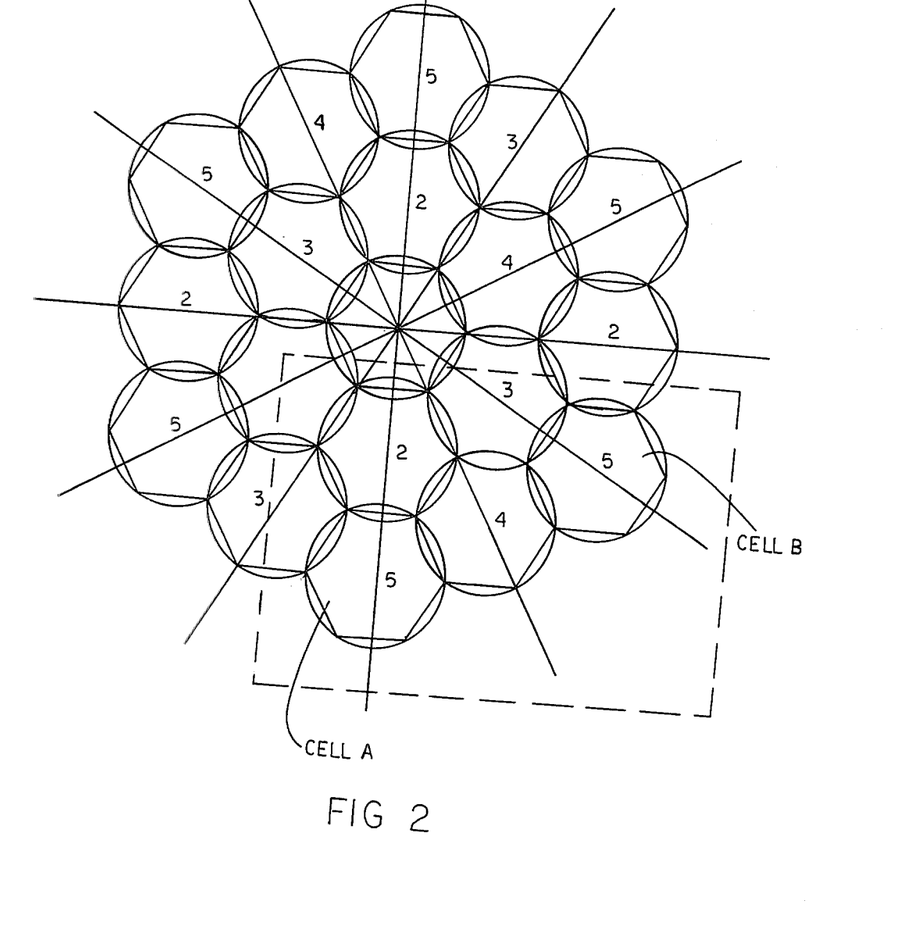
FIG. 2 shows how five frequency groups may be assigned between cells ordered in the cell cluster shown in FIG. 1.

In order to reduce co-channel interference (i.e. interference between radio transmissions in the same frequency group taking place within two cells that operate within the same frequency group), each individual cell within the cell cluster may be assigned an individual frequency group within which intra-cell transmissions take place. In FIG. 2, five such frequency groups are used, namely frequency group 1, frequency group 2, frequency group 3, frequency group 4, and frequency group 5. Each one of the frequency groups is shown in FIG. 2 by an Arabic numeral which is located within the cell to which it corresponds. In the center cell, all antennas transmit and receive radio transmissions within frequency group 1. The six cells immediately adjacent the center cell are assigned frequency groups in such a manner that diametrical symmetry results. Thus, a diametrically opposed pair of cells operates on frequency group 2, and the two other pairs of cells adjoining the center cell operate, respectively, on frequency groups 3 and 4.

The diametrical symmetry which obtains in the ring of six cells which adjoins the center cell prevails also in the outermost ring of cells within the cell cluster shown in FIG. 2. However, in this outermost ring the symmetry is extended from diametrical to fully radial—there are four quadruples of cells, with each cell quadruple sharing a common frequency group. Thus, the vertices of the cell cluster shown in FIG. 2 all operate on frequency group 5, with frequency groups 4 and 3 alternating between these vertices in such a fashion that cells which transmit and receive on the same frequency group never adjoin each other.

In FIG. 2, the portion of the Figure which is enclosed within a rectangular dotted line includes cell A and cell B. These cells are co-channel cells—they operate on the same frequency group. Moreover, because the antennas used are cosine-squared antennas, these neighboring co-channel cells are most susceptible to co-channel interference. The reason why this is the case is because the main transmission direction of their antennas enclose a smaller angle than do any other co-channel cells.

Figure 3A:
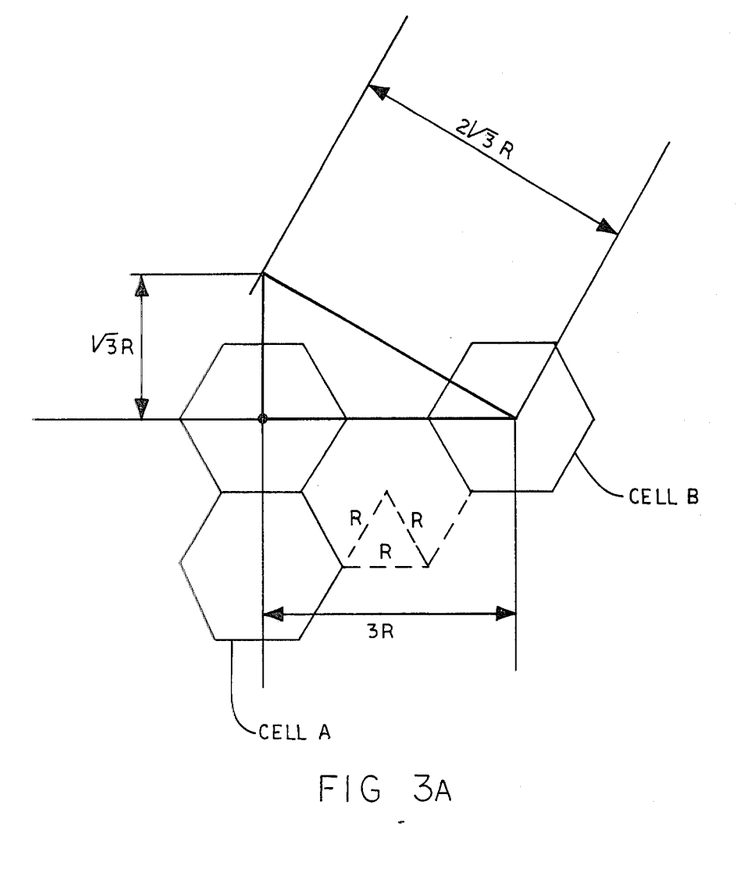
FIG. 3A is a detail view of two neighboring co-channel cells which shows some geometrical relationships obtaining therebetween.

FIG. 3A shows cell A and cell B along with two other cells. The centers of cell A and cell B are offset by a distance of 3R, as viewed in the drawing and not as measured center to center. It can thus be seen that a right triangle is formed in which the side of intermediate length has a length of 3R. Moreover, the right triangle in question is a 30°-60°-90° triangle since all of the cells are hexagonal. The triangle shown in FIG. 3A must simultaneously satisfy the Pythagorean Theorem and the requirement that the shortest side be one-half the length of the hypotenuse. Thus, it is known from geometry that since the side of intermediate length has a length of 3R, the shortest side will have a length of $\sqrt{3}R$.

Figure 3B:
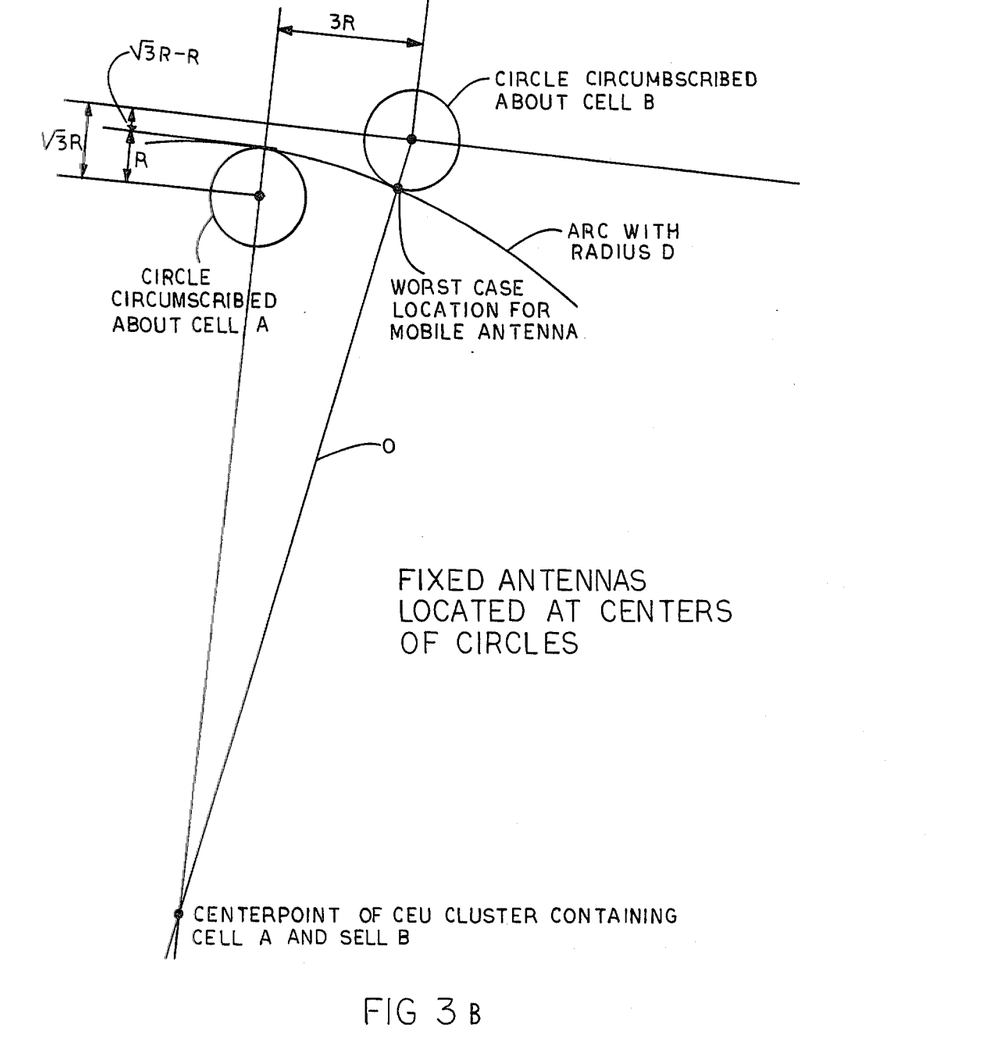
FIG. 3B shows the neighboring co-channel cells shown in FIG. 3A, along with a mobile antenna located near them, and is intended to demonstrate a worst-case analysis of the advantages accruing from the use of this invention.

FIG. 3B shows a worst-case analysis, utilizing the geometrical relationship above mentioned. It will be appreciated by those skilled in the art that the circumscribed circles around cells A and B represent lines of constant field strength. If an arc of a circle is struck which is tangent to the circles circumscribed about cell A and cell B, and if a moving transceiver is assumed to move along that arc and to reach a point where that arc is tangent to the circle circumscribed about cell B, it can be seen that a worst-case situation results.

With a mobile antenna located at this position, the arc on which it is located will be bisected by the main transmission direction through cell A from the center point of the cell cluster that contains both cell A and cell B. Inasmuch as it can thus be seen that the location in question is the worst case possible, in which co-channel interference will be maximal, it is only necessary to consider this case in determining the amount of co-channel interference.

A mobile antenna moving along this arc will receive a minimal amount of energy from the antenna which is associated with cell B, and will transmit an equally minimal amount of energy from the antenna which is associated with cell B, and will transmit an equally minimal amount of energy thereto. Moreover, this mobile antenna will receive a maximal amount of energy from the antenna associated with cell A, and will transmit a maximal amount of energy thereto. Because of the inverse square law, the field strength at the location of the mobile antenna resulting from the antenna associated with cell B will be inversely proportional to the square of 2R, which is the distance between the mobile antenna and the antenna associated with cell B. In a similar fashion, the field strength at the location of the mobile antenna resulting from the antenna associated with cell A will be inversely proportional to the square of 2D, where D is the radius of the arc.

It can be seen from FIG. 3B that a right triangle is formed with hypotenuse D+R and shortest side 3R. Once again, the side of intermediate length within this right triangle must satisfy the Pythogorean Theorem. By this theorem $$(D + R)^2 = (3R)^2 + \left(D + \sqrt{3}R - R\right)^2$$

$$= (3R)^2 + \left(D + \left(\sqrt{3} - 1\right)R\right)^2$$

$$D^2 + 2RD + R^2 = 9R^2 + D^2 + 2DR\left(\sqrt{3} - 1\right) + \left(\sqrt{3} - 1\right)^2 R^2$$

-continued $$2RD + R^2 = R^2\left(9 + \left(\sqrt{3} - 1\right)^2\right) + 2RD\left(\sqrt{3} - 1\right)$$

$$2RD\left(1 - \left(\sqrt{3} - 1\right)\right) = R^2\left(8 + \left(\sqrt{3} - 1\right)^2\right)$$

$$\frac{D}{R} = \frac{8 + \left(\sqrt{3} - 1\right)^2}{2\left(2 - \sqrt{3}\right)}$$

so that $$\frac{D}{R} \approx 15.9$$

Using the prior-art co-channel reuse ratio of $$\frac{D}{R} = \sqrt{3N} \quad \left(\frac{D^2}{R^2} = 3N\right),$$

it can be seen that, using the prior-art solution, N would exceed 84. Thus, with only 5 frequency groups used in the invention herein, results are achieved which, according to the prior art, would necessitate 84 frequency groups. Thus, almost a seventeen-fold increase in efficiency results. Since each frequency group will include perhaps 10 channels, over 840 channels are rendered superfluous.

Figure 4:
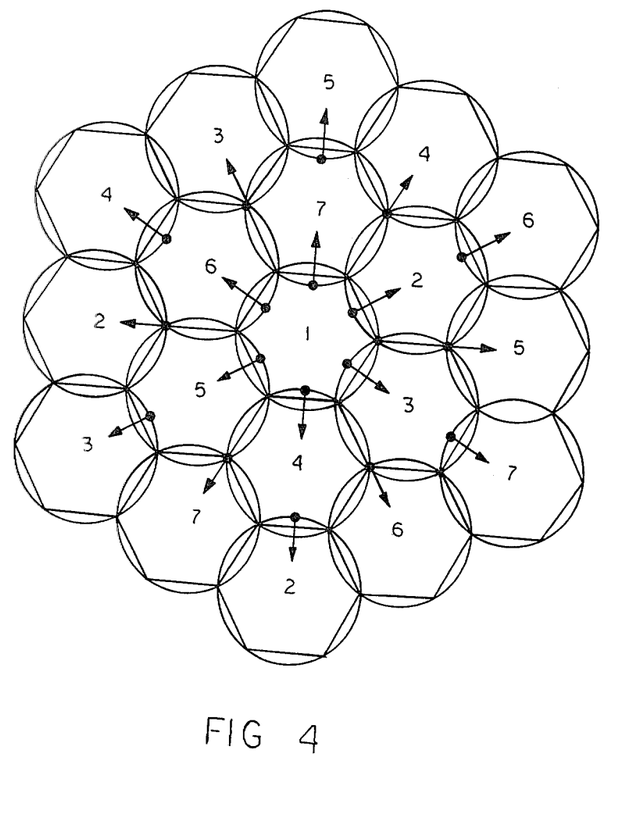
FIG. 4 shows how seven frequency groups can be assigned between the cells shown in the cell cluster of FIG. 1, thereby theoretically reducing co-channel interference to zero.

In FIG. 4, an embodiment of the invention is shown in which seven frequency groups are assigned to the nineteen cells within the cell cluster which has previously been described. It will be noted that none of the vertices of the cell cluster shown in FIG. 4 are co-channel cells—no two cells located at vertices of the hexagonal cell cluster share a common frequency group. Thus, co-channel interference is theoretically rendered impossible.

Figure 5:
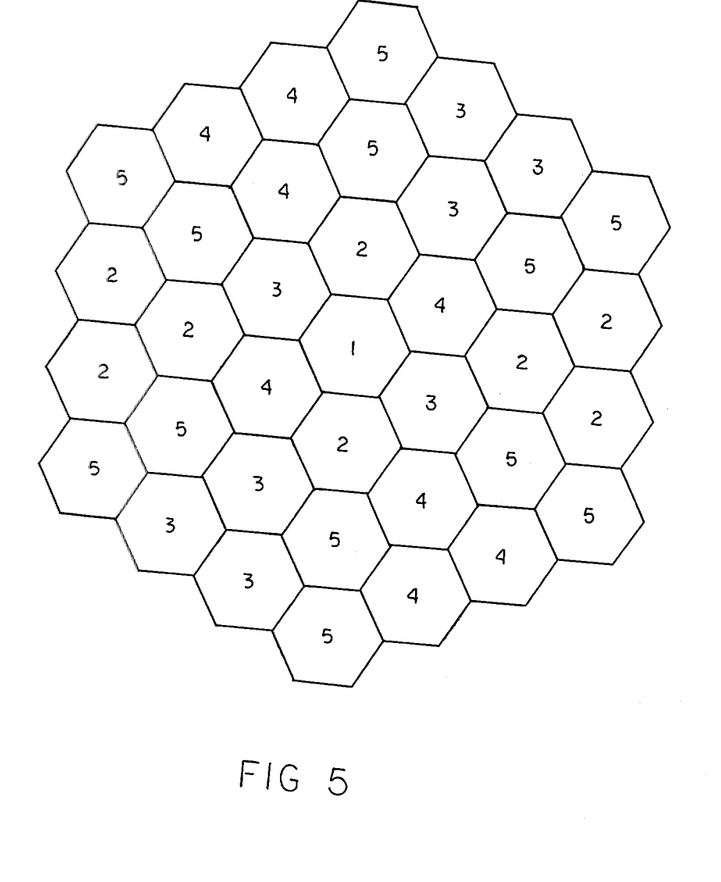
FIG. 5 shows a cell cluster having thirty-seven cells, and showing how five frequency groups may be assigned to these cells for use in a particular type of radio traffic environment.

A further embodiment of this invention, such as that shown in FIG. 5, can prove useful in traffic environments such as those which prevail in large cities. In such environments, there is usually a central business district in which radio traffic density is at a maximum, with such density falling off as distance from such central business district increases. However, as such density decreases, the need for high-density transmission capacity decreases, so that adjacent cells may share common frequency groups. Therefore, at the outer rings of the cell cluster shown in FIG. 5, adjacent cells are co-channel cells. In the embodiment shown in FIG. 5, only five frequency groups are utilized in a cell cluster which includes thirty-seven cells. In the two outermost rings of cells in this cell cluster, the same frequency groups are used so as to make the outermost ring a radial extension of the next-to-outermost ring for purposes of frequency group assignment.

It is of course always possible for each cell to be assigned a unique frequency group, in which case it is necessary to provide suitable apparatus which will couple a moving antenna to an adjacent fixed antenna associated with a cell when the mobile antenna is located therewithin.

It is quite obvious that there are many other possible arrangements of cells and assignment of frequency groups thereto which are possible, since cell cluster size and number of frequency groups utilized can be increased and varied as desired. Therefore, only a few further embodiments of particular utility will be discussed hereinafter.

Figure 6A:
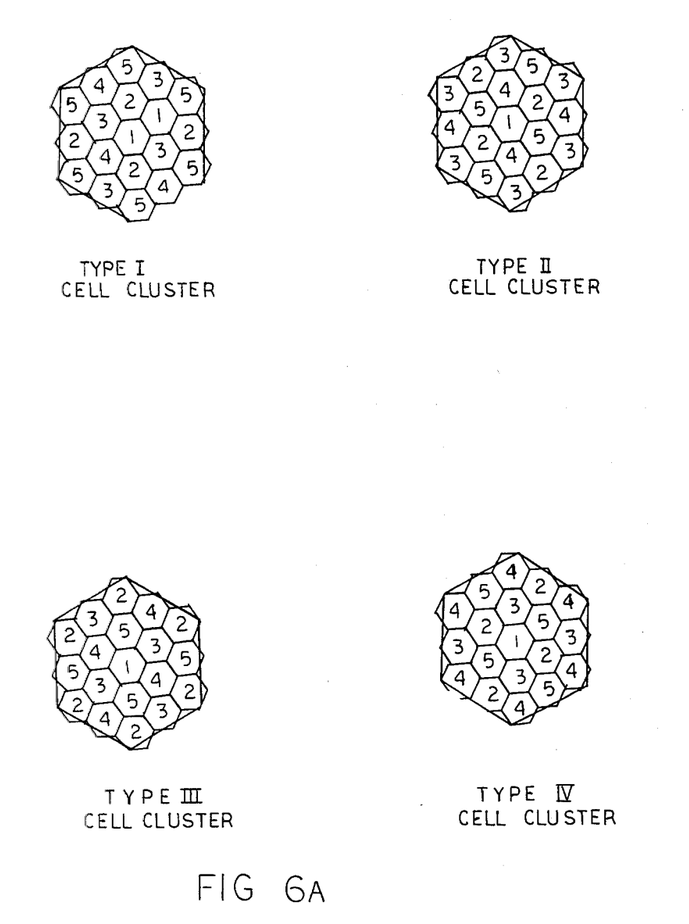
FIG. 6A shows how five frequency groups can be arranged in order to form four entirely different types of cell clusters.

Referring first to FIG. 6A, it can be seen that five frequency groups can be assigned to a nineteen-cell cell cluster in at least four ways. Hence, five frequency groups can generate: a type I cell cluster in which the vertices are assigned frequency group 5, with all other frequency groups being so ordered that no two adjacent cells are co-channel cells; a type II cell cluster, in which the vertices are assigned frequency group 3; a type III cell cluster, in which the vertices are assigned frequency group 2; and a type IV cell cluster, in which the vertices are assigned frequency group 4, the latter three types of cell clusters being elsewhere ordered so that, as in type I, no two adjacent cells are co-channel cells.

Figure 6B:
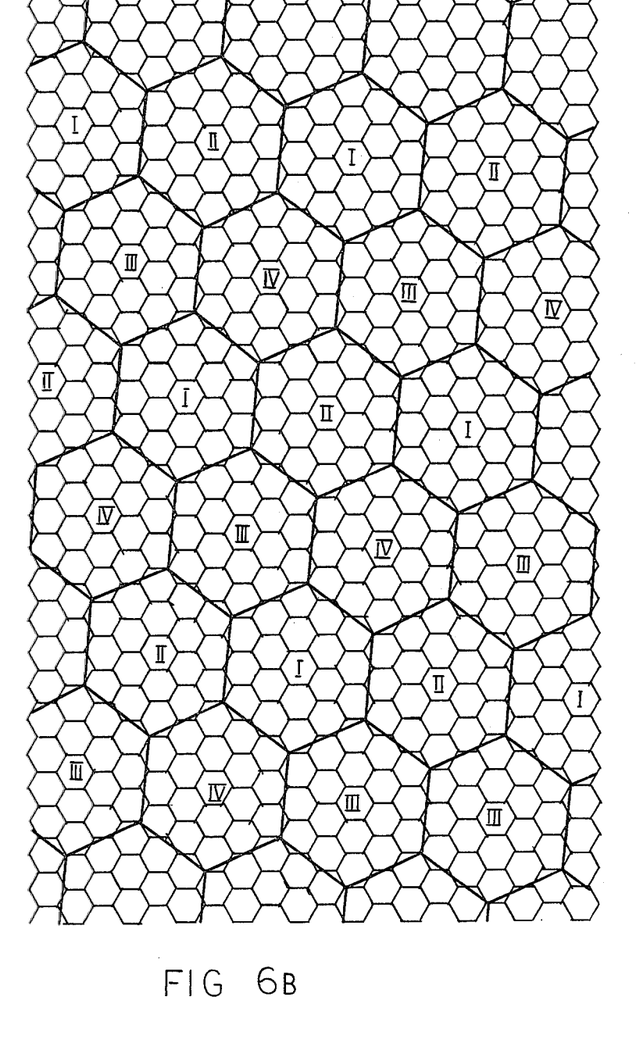
FIG. 6B shows how the cell cluster types shown in FIG. 6A may be arranged in order to provide an antenna array according to the principles of this invention.
Figure 6C:
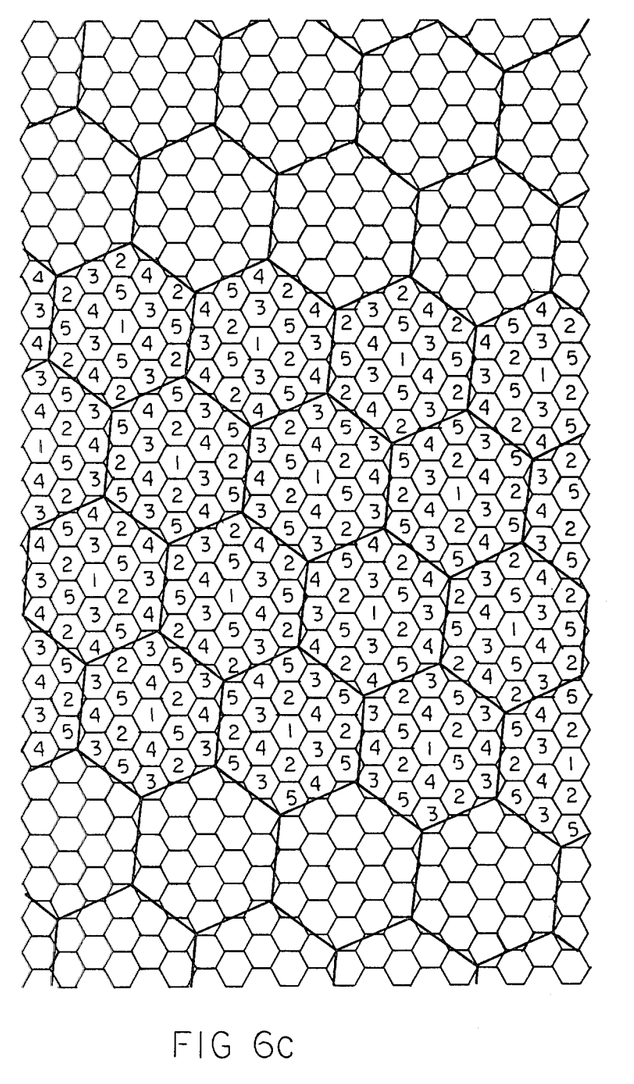
FIG. 6C shows the actual antenna array which is formed when the cell cluster types shown in FIG. 6A are arranged in accordance with FIG. 6B.

FIG. 6B shows how such cell clusters may be ordered with respect to each other so as to create an antenna array which satisfies the criterion that no two adjacent cells be co-channel cells. As can be seen from the final results shown in FIG. 6C, in which the individual cells are shown while the cell clusters are not individually identified by type, an advantageously variegated antenna array can be created. It will be noted that in each horizontal row of the antenna array shown in FIG. 6C and generated by cell cluster types such as are shown in FIG. 6A and arranged in FIG. 6B, only two cell cluster types exist, the types alternating one after another.

It will be noted that the antenna arrays disclosed herein exhibit a marked hexagonal form. In the event that user needs are appropriate, one or more cells can simply be removed without in any way affecting the remaining cells and their operation within the system. The embodiment of the invention shown in FIGS. 6A, 6B, and 6C can be particularly advantageous, since a recently developed solution to the four-color problem has proved that it is indeed possible to completely map any arbitrarily divided plane using only four colors, in such a fashion that no two regions of the same color abut each other. Inasmuch as the four-color problem is isomorphic to a four-type cell cluster embodiment as far as non-adjacent co-channel cells is concerned, this embodiment would appear to be suitable for all applications.

Figure 7:
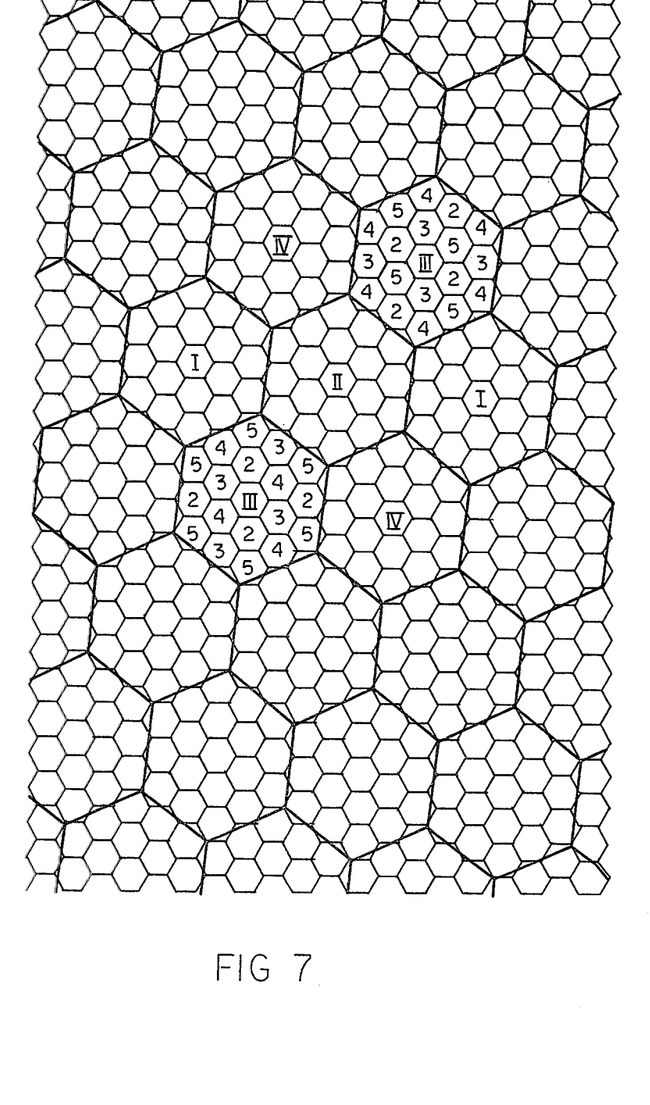
FIG. 7 shows another embodiment of this invention.

In the embodiment shown in FIG. 7, it can be seen that two anti-symmetric cell clusters are taught. As between the two, one cell cluster has vertices which are asigned frequency group 5, while corresponding vertices in the other cell cluster are assigned frequency group 4, and vice versa. In a similar fashion, cells assigned frequency group 3 in one cell cluster are assigned frequency group 2 in the other, and vice versa.

Figure 8:
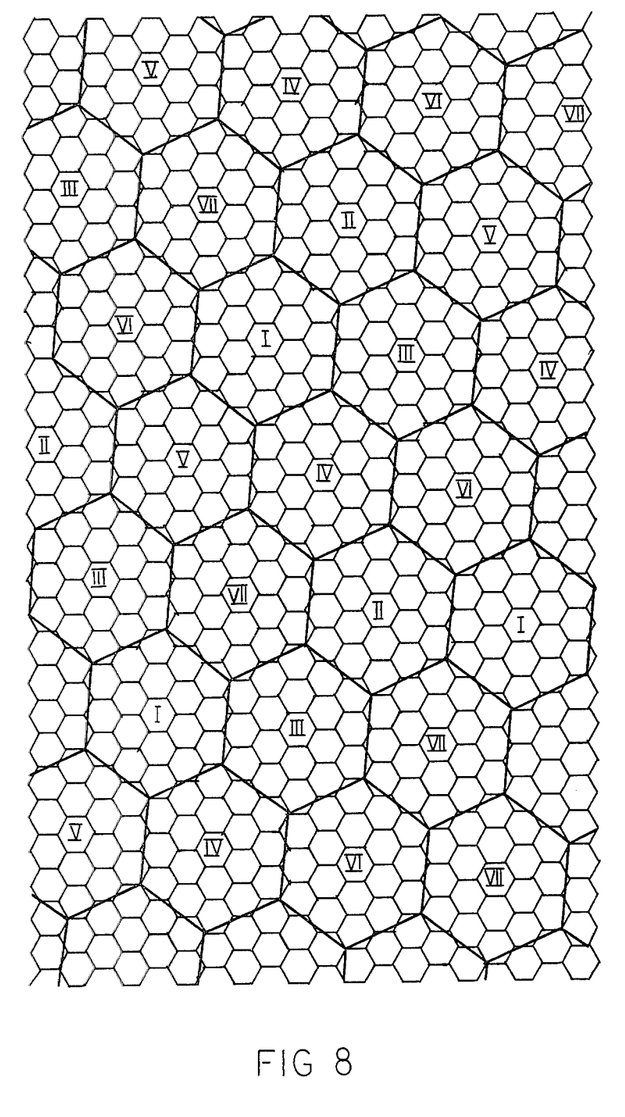
FIG. 8 shows how seven different types of cell clusters can be arranged in order to provide an antenna array according to the principles of this invention.

In FIG. 8, seven types of cell clusters are used. These types may be developed, e.g., from nineteen-cell cluster types which include both the cluster arrangements previously described plus anti-symmetric cluster types such as are shown in FIG. 7. It will be noted that the arrangement of the cell clusters in FIG. 8 exactly parallels the arrangement of individual cells such as were disclosed in the individual cell clusters shown in FIG. 4. In other words, in the embodiment of the invention shown in FIG. 8, it is not only true that no vertices of any individual cell cluster are co-channel cells, but it is also true that none of the cell clusters which are located along main transmission directions are co-channel clusters.

It will be understood that each of the elements described above, or two or more together, may also find a useful application in other types of method for siting cosine-squared antennas and antenna array obtained thereby differing from the types described above.

While the invention has been illustrated and described as embodied in a method for siting cosine-squared antennas and antenna array obtained thereby, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

What is claimed as new and desired to be protected by Letters Patent is set forth in the appended claims:

1. A method for optimally siting cosine-squared antennas within a geographical area, in order to create an antenna array suitable for use with mobile transceivers moving within the area, comprising: superimposing a dense hexagonal cellular grid system with like hexagonal cells upon the area; circumscribing a circle around each such cell; classifying all cells and circles circumscribed thereabout into like hexagonal cell clusters; locating a center cell in each such cell cluster; locating a centerpoint within each such center cell; and on each circle within each cell cluster excluding a circle circumscribed about the center cell therein, determining a site point which is closest to said centerpoint, each site point being an optimum antenna site within the area upon which a cosine-squared antenna may be located.

2. A method for assigning frequency groups to cosine-squared antennas within a cell cluster sited as defined by claim 1 when each cell cluster contains 19 cells, and when the centerpoint is an antenna site, comprising assigning each of the cells an individual frequency group from a set of seven frequency groups in accordance with FIG. 4 of the drawing, in which individual frequency assignments from the set are shown as numerals within corresponding cells, and in which circumscribed circles are also shown.

3. A method for assigning frequency groups to cosine-squared antennas within a cell cluster sited as defined by claim 1 wherein each cell cluster contains 37 cells, and when the centerpoint is an antenna site, comprising assigning each of the cells in individual frequency group from a set of five frequency groups in accordance with FIG. 5 of the drawing, in which individual frequency assignments from the set are shown as numerals within corresponding cells.

4. A method for assigning frequency groups to cosecant-squared antennas sited as defined by claim 1, when each cell cluster contains 19 cells, when there exist four types of cell clusters, and when the centerpoint of each cluster is an antenna site, comprising assigning each of the cells an individual frequency group from a set of seven frequency groups and thereby forming a type I cell cluster, a type II cell cluster, a type III cell cluster and a type IV cell cluster in accordance with FIG. 6A of the drawing, and arranging the type I cell clusters, the type II cell clusters, the type III cell clusters, and the type IV cell clusters in accordance with FIG. 6B of the drawing, in which individual frequency assignments from the set are shown as Arabic numerals within corresponding cells, and in which cell cluster types are shown as Roman numerals within corresponding cell clusters.

5. An array comprised of cosine-squared antennas, each antenna in the array being associated with a corresponding one of a plurality of like hexagonal cells, the cells being arranged in a dense hexagonal cellular grid system in a manner that a circle is circumscribed around each cell, all cells and circles circumscribed thereabout are classified into like hexagonal cell clusters, a center cell is located in each such cell cluster, a centerpoint is located within each such center cell, a cosine-squared antenna is located at least adjacent each such centerpoint, and a cosine-squared antenna is located at least adjacent to a point on each circumscribed circle within each cell cluster exclusive of circles circumscribed about such center cells, which point is that point on each such circumscribed circle which is closest to such centerpoint within such center cell within such cell cluster.

6. The array defined by claim 5, wherein each cell cluster includes 19 cells.

7. The array defined by claim 5 wherein antennas within each cell cluster are assigned individual frequency groups so as to create cell clusters which are symmetrical about their corresponding centerpoints and which have diagonals and medians which are perpendicular to each other within each cell cluster.

8. The array defined by claim 7, wherein each antenna in each cell within each cell cluster has an individual frequency group selected from a set of five frequency groups.

9. The array defined by claim 7, wherein each antenna in each cell within each cell cluster has an individual frequency group selected from a set of seven frequency groups.

10. The array defined by claim 5, wherein the cell clusters are classified into differing types and are so ordered that all cell clusters of a common type are separated from each other.

11. The array defined by claim 10, wherein there are four types of cell clusters.

* * * * *